United States Patent [19]
Hulke et al.

[11] Patent Number: 6,029,304
[45] Date of Patent: Feb. 29, 2000

[54] LIGHT INTERACTIVE TOOTHBRUSH

[75] Inventors: Stuart Hulke, Basking Ridge; Robert Moskovich, East Brunswick, both of N.J.

[73] Assignee: Colgate-Palmolive Company, New York, N.Y.

[21] Appl. No.: 09/093,800

[22] Filed: Jun. 9, 1998

[51] Int. Cl.[7] .................................................... A46B 5/00
[52] U.S. Cl. ............................ 15/105; 15/167.1; 362/109
[58] Field of Search ................................... 15/105, 167.1; 362/109, 555, 557, 572, 573, 577, 158, 367; 601/15; 433/29

[56] References Cited

U.S. PATENT DOCUMENTS

| | | | |
|---|---|---|---|
| 2,688,971 | 9/1954 | Daniels et al. | 15/105 |
| 3,261,978 | 7/1966 | Brenman | 15/105 |
| 3,943,815 | 3/1976 | Gilbert | 362/577 |
| 4,109,965 | 8/1978 | Lewis | 300/7 |
| 4,430,039 | 2/1984 | Boucherie | 414/417 |
| 4,580,845 | 4/1986 | Boucherie | 300/7 |
| 4,637,660 | 1/1987 | Weihrauch | 300/21 |
| 4,646,381 | 3/1987 | Weihrauch | 15/167.1 |
| 4,779,173 | 10/1988 | Carr et al. | 15/105 |
| 4,845,796 | 7/1989 | Mosley | 15/23 |
| 4,892,698 | 1/1990 | Weihrauch | 264/243 |
| 5,030,090 | 7/1991 | Maeda et al. | 433/29 |
| 5,045,267 | 9/1991 | Weihrauch | 264/243 |
| 5,160,194 | 11/1992 | Feldman | 15/167.1 |
| 5,224,763 | 7/1993 | Dirksing | 300/21 |
| 5,339,479 | 8/1994 | Lyman | 15/105 |
| 5,390,984 | 2/1995 | Boucherie | 300/21 |
| 5,595,437 | 1/1997 | Rapisarda et al. | 362/109 |
| 5,813,855 | 9/1998 | Crisio, Jr. | 15/167.1 |

*Primary Examiner*—Mark Spisich
*Assistant Examiner*—Theresa T. Snider
*Attorney, Agent, or Firm*—Henry S. Goldfine

[57] ABSTRACT

A toothbrush is provided with light interactive features, and has a light source such as a light emitting diode (LED) molded within its handle. In one embodiment, the toothbrush is molded from a transparent or translucent plastic material and is covered with an opaque covering, except at a plurality of discrete light-emitting points. A reflective layer over the molded body may also be provided. Light is internally reflected along the length of the body to the light-emitting points. The surface of the toothbrush at these points is roughened to emit a softened, diffused light. In another embodiment, a plurality of optic fibers or light pipes are molded in the body of the toothbrush, with their input ends positioned near the light source and their output ends terminating at the light-emitting areas. The body may be molded of an opaque elastomer or rubberized plastic material. A battery and switch may be molded with the LED in the grip end of the toothbrush handle. The switch can be formed as a flexible membrane and contact electrode which is depressed when the user grips the grip end of the toothbrush.

7 Claims, 3 Drawing Sheets

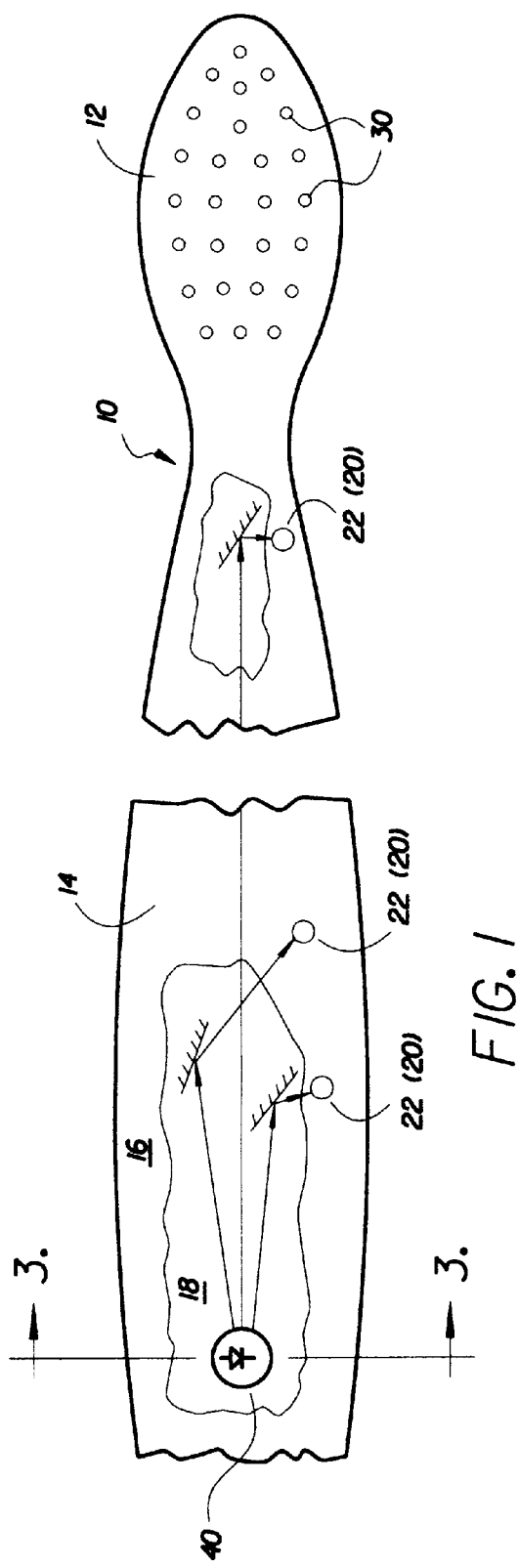
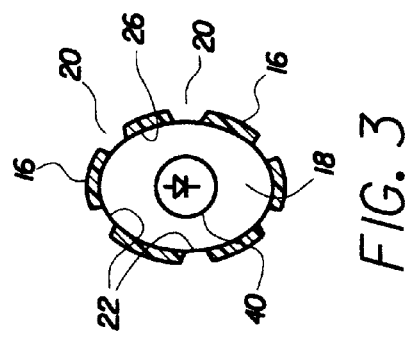
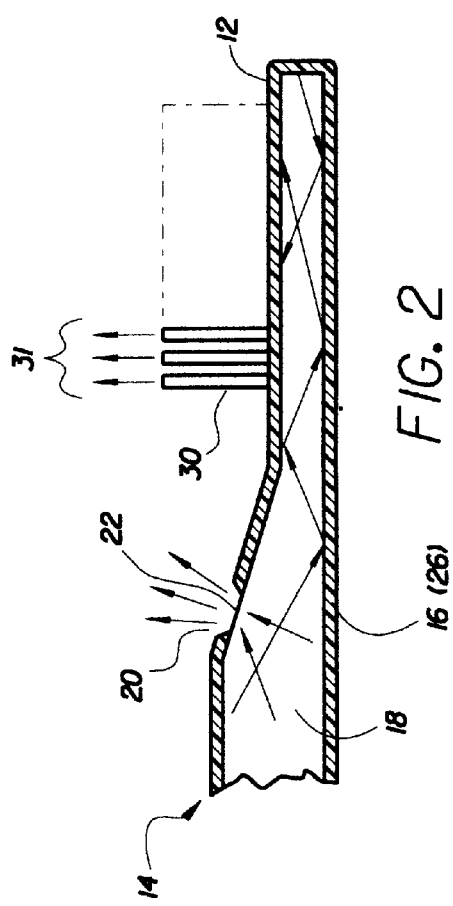
FIG. 1
FIG. 3
FIG. 2

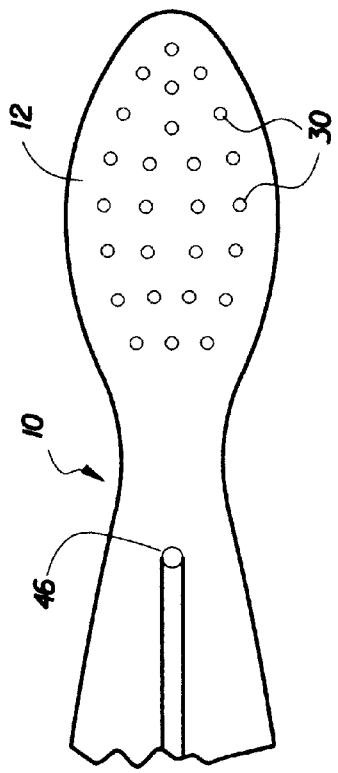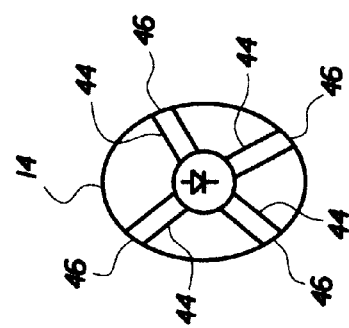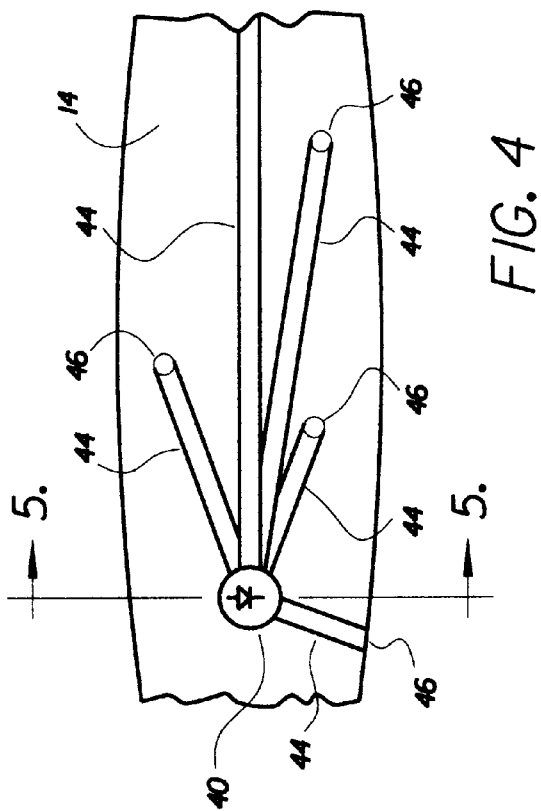

LIGHT INTERACTIVE TOOTHBRUSH

BACKGROUND OF THE INVENTION

This invention relates to a toothbrush having light interactive features, the toothbrush including a light source and light paths which yield a plurality of light points spaced apart on surface portions of the handle, or the head or both, of a toothbrush.

Known illuminated toothbrush constructions include an enlarged handle housing circuitry for powering small light bulbs mounted in the handle wall to form a plurality of light points on the surface of the toothbrush. This is seen in U.S. Pat. No. 5,339,479 issued to Lyman, and U.S. Pat. 4,845,796 issued to Mosley. The purpose of such a construction is, at least partially, to motivate children to brush their teeth, as the pinpoints or discrete areas of light are deemed to add an element of interest and novelty to the brushing process. While apparently successful in carrying out this motivational purpose, these known toothbrushes are somewhat bulky and not similar to a conventional toothbrush configuration, thereby possibly evoking possible consumer resistance to their purchase.

Conventional toothbrushes may be manufactured by any one of several technologies currently available. The body itself may be injection molded in a single or multistep process. While certain of the bristles may be attached to the head of the toothbrush by staples as is conventional, the bristle bars, scoops and other densely packed bristles generally must be attached using newer staple-free technology such as fusion, or injection molding. Injection molding is presently preferred. Fusion technology, whereby the brush body is preformed then softened and the bristle tufts are melted and fused to the softened brush body is also useful.

Injection molding is carried out on conventional machinery such as those published in the following patents, each of which is expressly incorporated herein by reference: U.S. Pat. No. 4,430,039, issued Feb. 7, 1984; U.S. Pat. No. 4,580,845, issued Apr. 8, 1986; U.S. Pat. No. 5,143,425, issued Sep. 1, 1992; and U.S. Pat. No. 5,390,984, issued Feb. 21, 1995.

Other useful techniques for attaching bristles to a body, such as thermoforming, fusion, welding, and the like, are illustrated in the following patents, which are expressly incorporated herein by reference: U.S. Pat. No. 4,109,965, issued Aug. 29, 1978; U.S. Pat. No. 4,619,485 issued Oct. 28, 1986; U.S. Pat. No. 4,637,660 issued Jan. 20, 1987; U.S. Pat. No. 4,646,381 issued Mar. 3, 1987; U.S. Pat. No. 4,892,698 issued Jan. 9, 1990; U.S. Pat. No. 5,045,267 issued Sep. 3, 1991; U.S. Pat. No. 4,988,146 issued Jan. 29, 1991; and U.S. Pat. No. 5,224,763 issued Jul. 6, 1993.

Staple-free attachment results in no holes in the brush body, where water could collect and bacteria and germs grow. Most preferred is supplying the bristles to an injection mold, and injection molding the brush body around the bristles for a tight fit. The rubber grips may be injection molded over the body. Other variants include a compact head version wherein the head is no more than 2.25 cm, wherein the head is substantially shorted. Also contemplated is a full head variant having a head of about 2.5 to 3.5 cm. Bristles of varying length, stock, stiffness and thickness all are contemplated.

SUMMARY OF THE INVENTION

According to the practice of this invention, a light interactive toothbrush is formed of generally conventional form and shape. The handle is provided internally with a small light source, such as a light emitting diode (LED), at a thickened grip end of the handle. In one embodiment, the toothbrush is molded with an inner body of transparent or translucent plastic material and an opaque outer layer formed with discrete, spaced-apart openings or windows on its surface. The openings expose the surfaces of the plastic inner body beneath, which may be roughened to emit a softened, diffused light through the windows.

Light from the LED travels along the length of the handle and is internally reflected such that reflected light rays striking the roughened windows exposed through the opaque outer layer can emit light at discrete points on the handle and, if desired, also at the head. This first embodiment may also include a highly reflective coating applied over the plastic inner body and under the opaque outer coating, except at those areas used for the light points or windows, to ensure that most of the light is reflected down the length of the handle and not substantially absorbed by the opaque outer coating. Alternatively, reflective patches may be applied over areas of the handle which are positioned to gather and direct light toward the windows in the handle surface.

In accordance with a second embodiment of the invention, a toothbrush is molded of an opaque elastomer or plastic material (although a transparent translucent material could also be used) enclosing a plurality of totally internally reflecting optic fibers within the handle. The input ends of these fibers are positioned adjacent the light source, and the output ends of the fibers are preferably roughened to emit a diffuse light at points where they are mounted flush with the molded surface of the toothbrush. The light from the light source is totally internally along the fibers, and then passes outwardly from the toothbrush through the roughened output ends which disperse a soft light to the viewer.

BRIEF DESCRIPTION OF THE DRAWINGS

FIG. 1 is a partially broken view, in top plan, of a toothbrush of this invention according to a first embodiment.

FIG. 2 is a partial view, in side elevation, of the toothbrush of FIG. 1.

FIG. 3 is a view taken along section 3—3 of FIG. 1 and is partially schematic.

FIG. 4 is a view similar to FIG. 1 and illustrates a second embodiment.

FIG. 5 is a view taken along section 5—5 of FIG. 4 and is partially schematic.

DETAILED DESCRIPTION OF THE DRAWINGS

Figure 7:
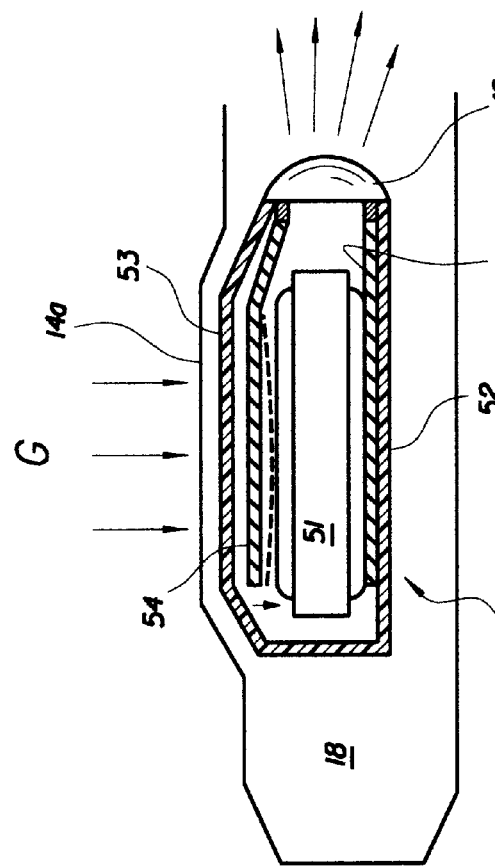
FIG. 7 is a schematic view of a unit containing a battery, switch, and LED molded in the toothbrush.

Referring now to FIG. 1 of the drawings, the numeral 10 denotes generally a toothbrush formed in accordance with a first embodiment of this invention. The toothbrush body includes a head 12 and a handle denoted generally as 14. At the end of the handle 14 that is gripped by the user, which typically has a greater thickness than other parts of the handle, a light source 40 such as an LED is provided, preferably molded into the handle with a power source, such as a battery, and a switch for turning the light on and off (to be described further below). As shown more clearly in FIGS. 2 and 3, the toothbrush body is provided with an outer covering of an opaque material, such as a hard rubber or rubberized plastic coating, denoted as 16, with the inner body 18 being formed of a transparent or translucent plastic material. Light from the light source is reflected along the length of the inner body 18 by internal reflection. Covering 16 is provided with a plurality of openings or windows 20 each of which exposes the surface of the light-transmissive plastic inner body through the covering 16. The exposed surfaces of the plastic inner body, designated as 22, are preferably roughened so that a softened, diffused glow is emitted through the surface of the handle at the desired points of light.

In a preferred version, a highly reflective layer 26, such as an aluminum foil or metallized coating, may be applied over the surface of the plastic inner body 18 under the opaque outer coating 16, except at the window areas 20. The reflective coating serves to reflect substantially all of the light from the LED 40 along the length the handle, so that a substantial portion is not lost by absorption into the opaque outer layer. Alternatively, the opaque outer covering 16 may be formed with a reflective inner surface 26 such as by having fine reflective particles dispersed therein.

The light from LED 40 is transmitted by the light-transmissive inner body 16 and reflected by internal reflection from the reflective layer 26, as indicated by the arrows in FIG. 2. Openings 20, which are neither coated by reflective layer 26 nor covered by the opaque coating 16, as well as the uncovered brush area of the head 12 emit the light from the inner body, as designated at 31. Head 12 is provided with tufts of bristles denoted generally as 30. FIG. 2 shows that some of the reflected light from source 40, reflected along the toothbrush inner body, enters the head 12 and exits through the base of translucent or transparent tufts 30.

Referring now to FIGS. 4 and 5, a second embodiment of the invention of illustrated which is similar in function to the first embodiment. However, instead of relying upon reflected or scattered light within the inner body to pass out through exposed openings in the handle, a plurality of optic fibers 44, which may be termed "light pipes", are molded in place within an opaque plastic material forming the handle. These fibers may be formed of the same transparent or translucent plastic material used to form the light-transmissive inner body of FIGS. 1–3. The respective input ends of these fibers are, as illustrated at FIG. 4, located next to light source 40, and the output ends 46 terminate flush at chosen areas of the surface of the handle. Typically, the exit ends 46 of the optic fibers are roughened to assist in the diffusion of exiting light. In this embodiment of the invention the toothbrush may be formed of an opaque material such as an elastomer or rubber or an opaque plastic. This material may be molded around the optic fibers by the known over-molding process.

Figure 6:
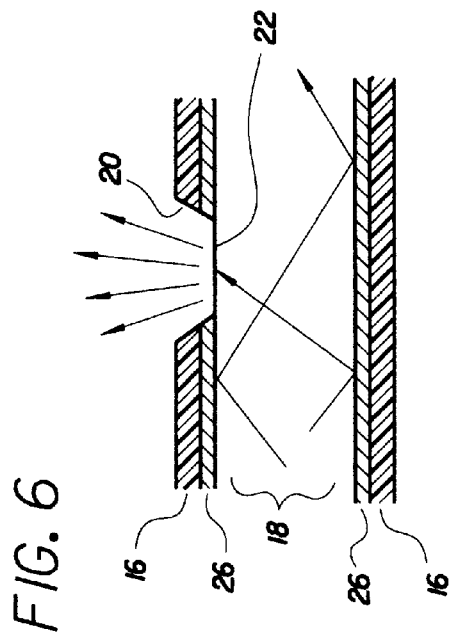
FIG. 6 is a sectional view of the layered structure of the first embodiment of the toothbrush.

Referring to FIG. 6, the layered structure of the preferred first embodiment is shown in greater detail. The inner body 18 is formed by molding a light-transmissive plastic material. The reflective layer 26 is formed as a coating applied on the surface of the inner body, or as a reflective under-surface of the outer covering 16. The reflective layer may be formed as a metal foil layer, or as a metallized coating, or as a layer having reflective particles embedded in a substrate fabricated by known extrusion techniques. The outer covering 16 and reflective layer 26 may be formed by over-molding the surface of the inner body around resist material applied at the areas where windows 20 are to be formed. After the resist material is removed, the surface 22 of the inner body is exposed through the window 20, and may be roughened by mechanical or chemical agents for the emission of diffused light.

For the above embodiments, a battery power source and switch unit may be embedded within the toothbrush handle with the LED. A schematic illustration of one preferred example for the unit is shown in FIG. 7. The unit 50 is molded inside the inner body 18 at the grip end of the handle for the toothbrush. Besides the LED 40 mounted at its forwardly facing end, the unit 50 includes a battery 51, an insulative housing 52, a flexible upper membrane 53, and a flexible contact electrode 54, and a fixed electrode 55. The battery is mounted in a fixed position in the housing 52 with one terminal in conductive contact with the fixed electrode 55, which is coupled to one terminal of the LED 40. The flexible contact electrode 54 is positioned in spaced relation above the other terminal of the battery and is coupled to the other terminal of the LED 40.

The material for the toothbrush handle is molded over with a low thickness over the area of the flexible upper membrane 53 of the unit 50 to form a protruding pressure grip area 14a. As pressure force G is applied to the grip area 14a, due to the fingers of the user gripping the toothbrush handle, the skin of the toothbrush handle molded over the grip area 14a and the membrane 53 deform elastically downward so as to push the contact electrode 54 into electrical contact with the terminal of the battery 51, thereby causing power to be supplied to illuminate the LED 40. Thus, while a user is brushing with the toothbrush, the points of light formed in the outer surface of the toothbrush and the brush area will emit a soft glow of light, giving the user motivating feedback to brush long and often.

A standard micro battery that may be used can provide sufficient power to illuminate the toothbrush during brushings for six to twelve months, which is about the normal useful life of a toothbrush. However, if it desired to offer a toothbrush that allows replacement of the battery, an access latch can be provided on the toothbrush handle, such as on the underside of the pressure grip area 14a.

Instead of continuous lighting, the light interactive toothbrush may be constructed to be motion-activated, i.e., to emit light only when the toothbrush is in motion during brushing. One example of a motion-activated light device which can be incorporated in the toothbrush is shown in U.S. Pat. No. 5,595,437 to Rapisarda, issued Jan. 21, 1997, the description of which is incorporated herein by reference. The device has a spring which is intermittently moved by the brush motion in contact with the battery terminal to power the light.

While certain preferred embodiments have been described above, it is understood that many variations and modifications thereof may be made within the scope and spirit of the disclosed invention, as is defined in the following claims.

What is claimed is:

1. A light interactive toothbrush comprising:
    a body formed of a handle having a longitudinal axis and a head at one end thereof, which head contains a face having a plurality of bristle tufts extending therefrom;
    the body being hollow containing means for producing light therein, the body being constructed of three layers, an outermost layer, a middle layer and an innermost layer;
    the outermost layer being an opaque material, which contains a plurality of openings which expose portions of the middle layer, which middle layer is molded of a light-transmitting plastic material;
    the innermost layer is a highly reflective material which is applied over an inner surface of the middle layer, except at the plurality of openings in the outermost layer of opaque material so as to form corresponding openings in the innermost layer with the openings in the outermost layer, to allow the light produced within the body to be emitted from the corresponding openings.

2. A toothbrush according to claim 1, wherein the portions of the light-transmitting middle layer exposed by the openings in the outermost layer are roughened, such that the light emitted therethrough is emitted as softened, diffused light.

3. A toothbrush according to claim 1, wherein the highly reflective coating is a metal toil or metallized coating.

4. A toothbrush according to claim 1, wherein the means for producing light contains a LED light source, a battery power source and a switch means.

5. A toothbrush according to claim 4, wherein the switch means is formed of a contact electrode in the handle, which contact closes and opens an electrical circuit to operate the LED light source when a user grips the toothbrush handle.

6. A toothbursh according to claim 1, wherein the outermost layer is constructed of a hard rubber or rubberized coating.

7. A light interactive toothbrush comprising:

a body formed of a handle having a longitudinal axis and a head at one end thereof, which head contains a face having a plurality of bristle tufts extending, therefrom;

the body being hollow containing means for producing light therein, the body being constructed of three layers, an outermost layer, a middle layer and an innermost layer;

the outermost layer being an opaque material which contains a plurality of openings which expose portions of the middle layer, which middle layer is molded of a light-transmitting plastic material;

the innermost layer is a highly reflective material which is applied over discrete portions of the inner surface of the middle layer such that the highly reflective material is positioned so as to gather and direct light directly from the light source to the light emitting openings in the outermost layer of opaque material.

* * * * *